United States Patent
Li Preti et al.

(10) Patent No.: US 7,128,552 B2
(45) Date of Patent: Oct. 31, 2006

(54) SELF-CLEANING MOLD VALVE FOR A MOLDING SYSTEM

(75) Inventors: Alfredo Li Preti, Toronto (CA); Andrej Petricko, Mississauga (CA)

(73) Assignee: Mirolin Industries Corporation, Ontario (CA)

( * ) Notice: Subject to any disclaimer, the term of this patent is extended or adjusted under 35 U.S.C. 154(b) by 433 days.

(21) Appl. No.: 10/394,521

(22) Filed: Mar. 21, 2003

(65) Prior Publication Data

US 2004/0185140 A1    Sep. 23, 2004

(51) Int. Cl.
*B29C 45/57* (2006.01)

(52) U.S. Cl. .................. 425/183; 425/557; 425/558

(58) Field of Classification Search ............. 425/557, 425/558, 559, 561, 183
See application file for complete search history.

(56) References Cited

U.S. PATENT DOCUMENTS

| | | | | |
|---|---|---|---|---|
| 3,964,856 A | * | 6/1976 | Day | 425/503 |
| 4,898,714 A | * | 2/1990 | Urban et al. | 422/133 |
| 4,973,239 A | * | 11/1990 | Herrmann et al. | 425/135 |
| 5,277,567 A | * | 1/1994 | Bauer et al. | 425/130 |
| 5,770,245 A | * | 6/1998 | Takizawa et al. | 425/549 |
| 5,798,128 A | * | 8/1998 | Dumazet et al. | 425/147 |
| 2002/0124988 A1 | * | 9/2002 | Takizawa et al. | 164/312 |

* cited by examiner

*Primary Examiner*—Joseph S. Del Sole
*Assistant Examiner*—Emmanuel S. Luk
(74) *Attorney, Agent, or Firm*—Carlson, Gaskey & Olds

(57) ABSTRACT

A mold valve assembly includes a mold valve chamber having an output port and an injection chamber in communication with the mold valve chamber. A first actuator drives an injection piston within the injection chamber to drive mixture material from an inlet port into the mold valve chamber. A second actuator drives a mold valve piston along the mold valve axis within the mold valve chamber to drive mixture material through an outlet and into a mold cavity of a mold assembly. The mold valve piston closely fits within the mold valve chamber to scrape along an end segment of the injection piston to clean any mixture material remnants therefrom such that remnants within the mold valve chamber are minimized and the necessity of flushing between injection cycles is substantially eliminated.

4 Claims, 5 Drawing Sheets

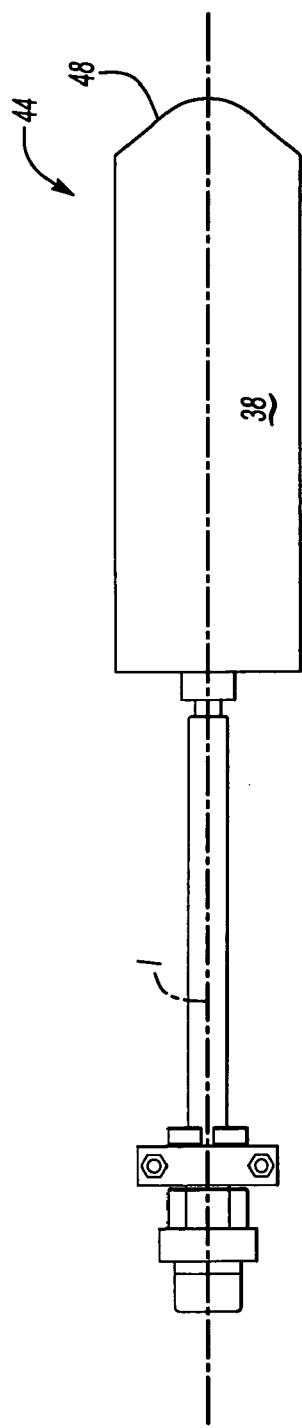
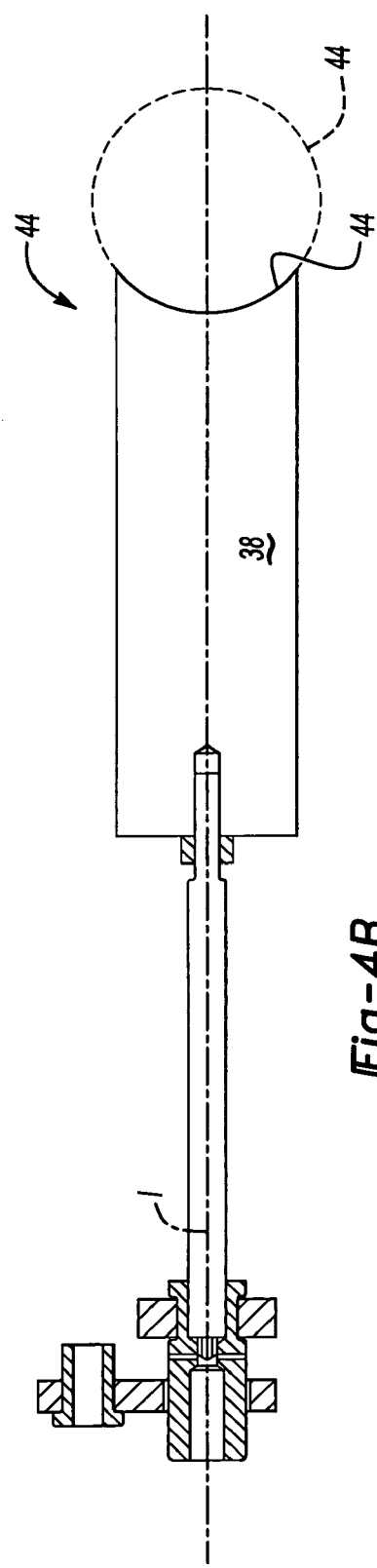
Fig-4A
Fig-4B

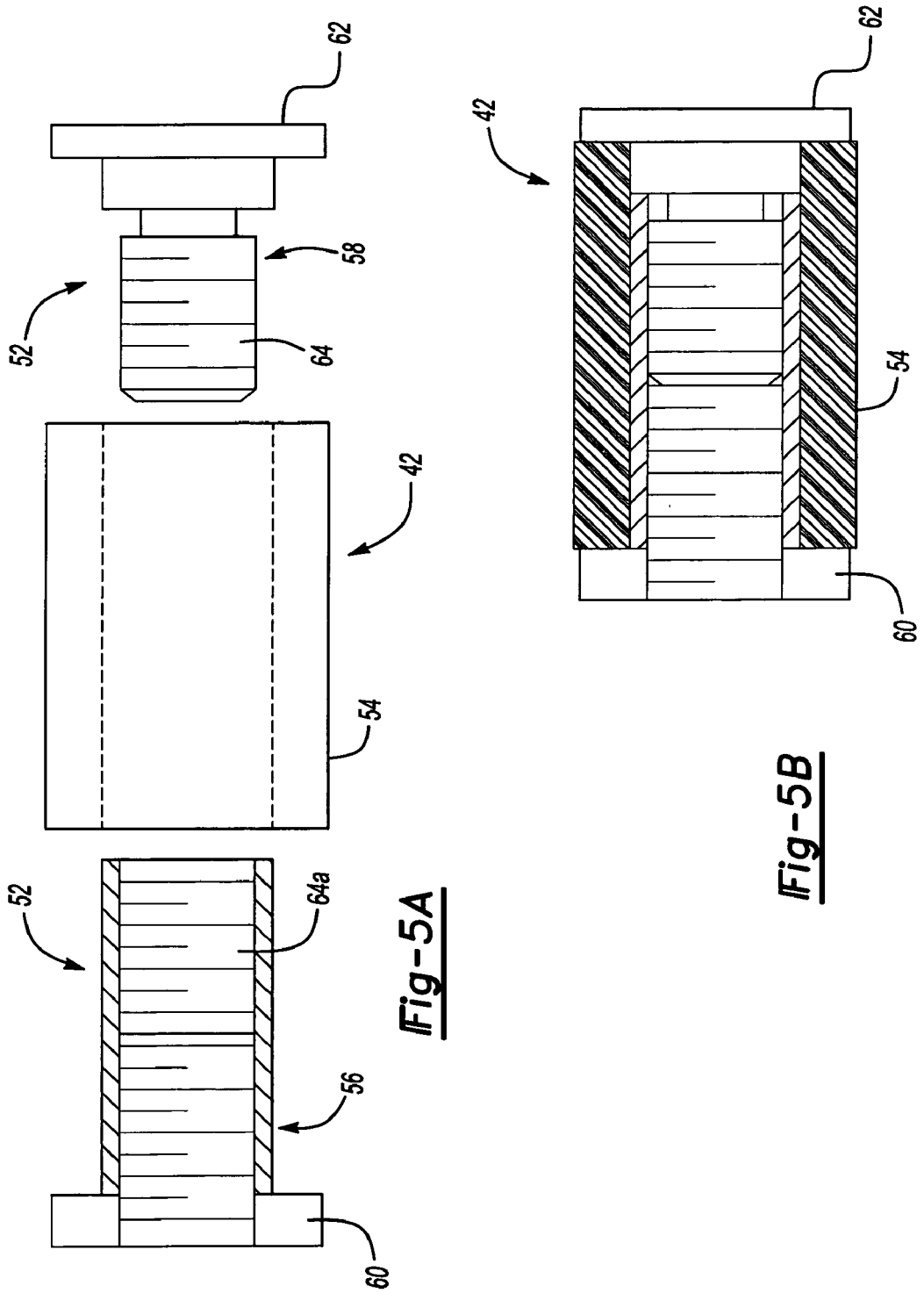

ously dispensed of after usage.

SELF-CLEANING MOLD VALVE FOR A MOLDING SYSTEM

BACKGROUND OF THE INVENTION

The present invention relates to a mold valve for a molding system and, more particularly, to a piston arrangement which minimizes the requirement of flushing.

A typical molding system provides for the mixing of at least two materials to form a mixture that is discharged into a mold cavity to form a finished article. The materials are typically fed from a supply by a delivery or feed assembly which communicates with a mixing head. The materials are mixed by the mixing head and discharged into the mold cavity through a mold valve. The mold assembly and attached mold valve are heated to cure the molded article.

It is therefore essential to cleanse the mold valve of any residual material to prevent the remnants from curing within. Typically, the mold valve is flushed after each cycle prior to curing to remove the potential for remnants curing within and locking the mold valve assembly. This is time consuming and expensive as the flushing fluid must be safely disposed of after usage.

Accordingly, it is desirable to provide a mold valve that minimizes the necessity of flushing between injection cycles to decrease the cycle time for production and expense of each finished article.

SUMMARY OF THE INVENTION

The present invention provides a mold valve assembly which generally includes a mold valve chamber having an output port and an injection chamber in communication with the mold valve chamber. The mold valve chamber defines a mold valve axis and the injection chamber defines an injection chamber axis. The injection chamber axis is transverse to the mold valve axis. An inlet port in communication with the injection chamber defines an inlet axis angled relative the mold valve axis.

An actuator drives an injection piston along the injection chamber axis within the injection chamber to drive mixture material from the inlet port into the mold valve chamber. An actuator drives a mold valve piston along the mold valve axis within the mold valve chamber to drive mixture material through the outlet and into a mold cavity of a mold assembly.

The mold valve piston closely fits within the mold valve chamber and scrapes along an end segment of the injection piston to clean any mixture material remnants therefrom, such that remnants within the mold valve chamber are minimized. The necessity of flushing between injection cycles is substantially eliminated as the plunger need only be cycled up and down. Cycle time for production and expense of each finished article is thereby decreased.

The present invention therefore provides a mix head which minimizes the necessity of flushing between injection cycles to decrease the cycle time for production and expense of each finished article.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 4A is an expanded side view of an injection piston;

FIG. 4B is an expanded top view of the injection piston of FIG. 4A rotated 90 degrees;

FIG. 5A is an exploded view of a mold valve piston of the mold valve assembly according to the present invention;

FIG. 5B is an perspective view of the mold valve piston of FIG. 5A in an assembled condition.

DETAILED DESCRIPTION OF THE PREFERRED EMBODIMENT

Figure 1:
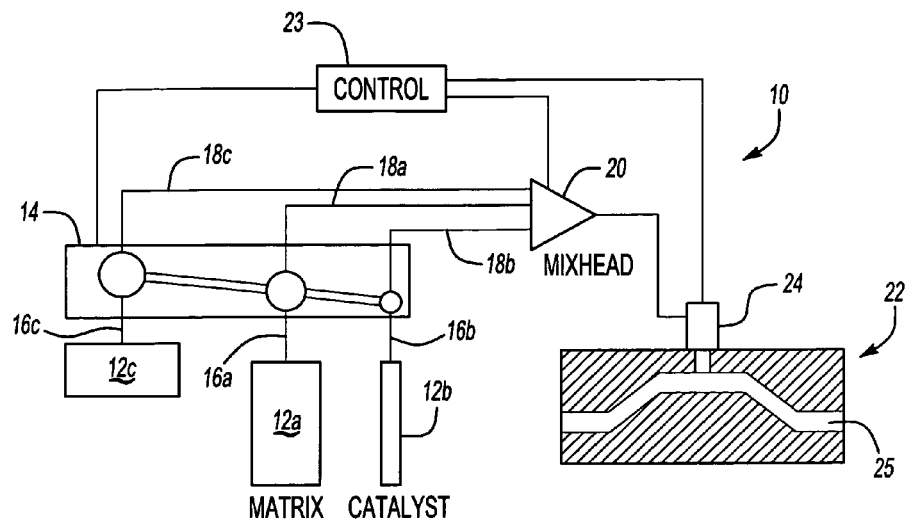
FIG. 1 is a simplified schematic representation of a multiple material molding system having a valve assembly designed according to the present invention.

FIG. 1 schematically illustrates a multiple material molding system 10. The system 10 generally includes a plurality of material supplies 12A, 12B and 12C, which communicate with a feed assembly 14 through respective supply conduits 16A–16C. It should be understood that the materials include fluids and solids. The feed assembly 14 drives a desired quantity of material from each material supply 12A–12C through output conduits 18A–18C to a mix head assembly 20. The mix head assembly 20 thoroughly mixes the material from each material supply 12A–12C and injects the mixture material into a mold assembly 22 through a mold valve assembly 24.

Preferably, a controller 23 communicates with the feed assembly 14, the mix head assembly 20, and the mold valve assembly 24 to assure the system 10 is operating within predefined parameters. Controls for injection-molding equipment are known in the art and further description of the algorithms will not be further detailed herein.

The mix head assembly 20 mixes the multiple of materials components, e.g., material matrix, to form a settable mixture which is then discharged into a mold cavity 25 of the mold assembly 22 through the mold valve assembly 24. The mold valve assembly is then located in an oven or the like to cure the mixture to form an article defined by the mold cavity 25.

Typically, a single mix head 20 feeds the matrix into a multiple of mold assemblies which are arranged in an assembly line like environment. The mold valve assembly 24 according to the present invention minimizes matrix remnants within the mold valve assembly 24 such that the mold valve assembly 24 need not be flushed after each cycle injection.

Figure 2:
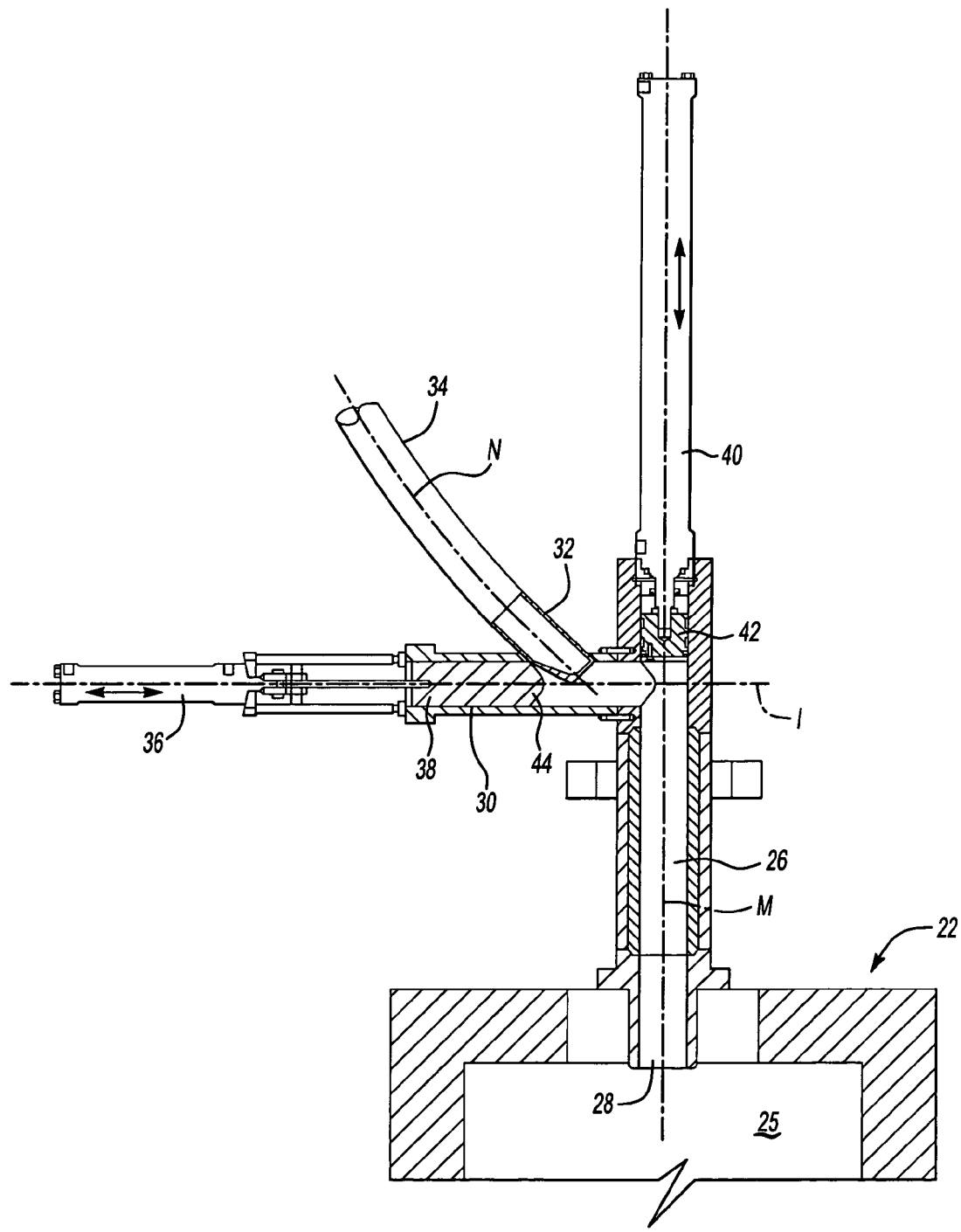
FIG. 2 is an expanded partial sectional view of a mold valve assembly.
Figure 3:
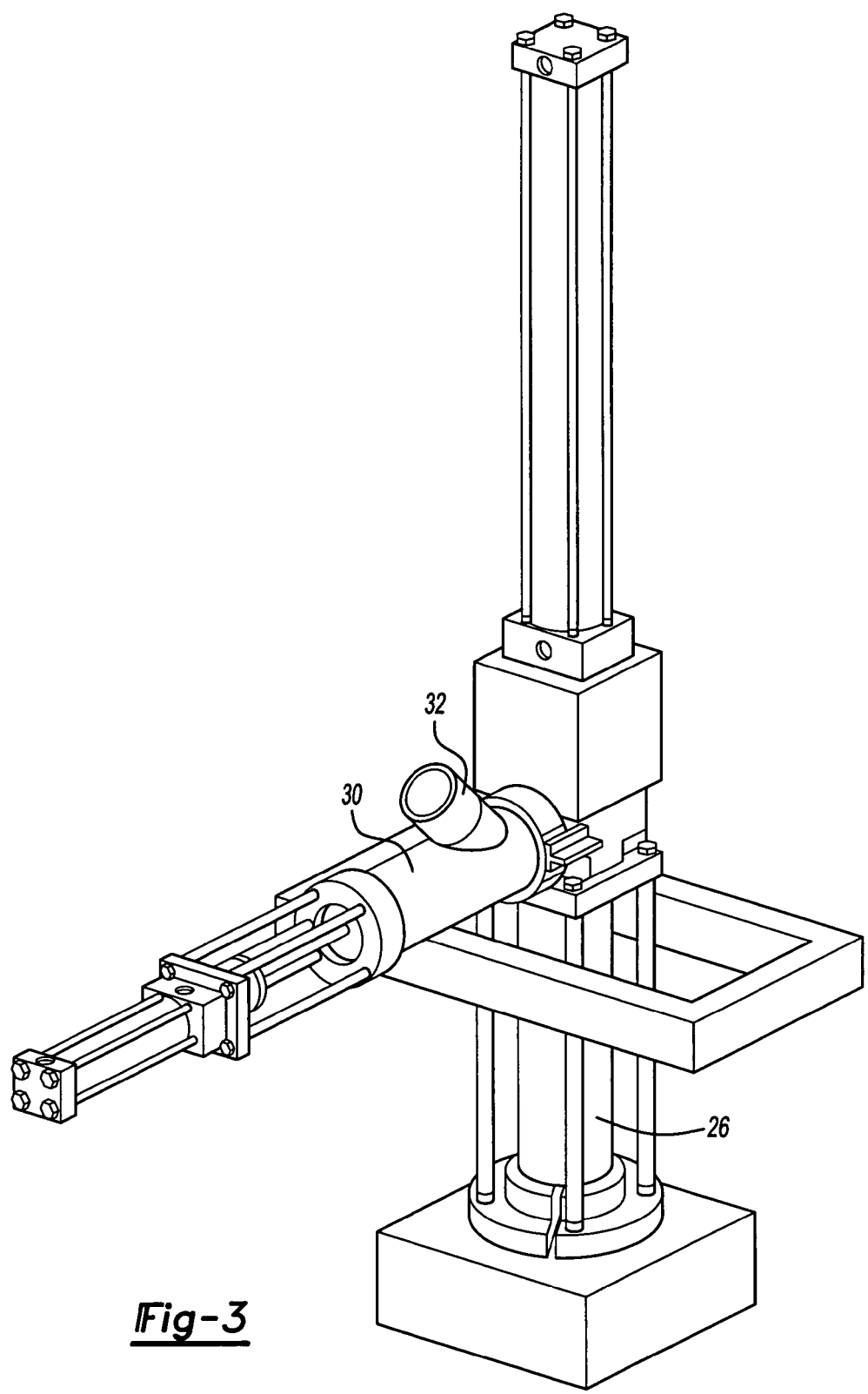
FIG. 3 is a perspective view of the mold valve assembly of FIG. 2.

Referring to FIG. 2, a schematic view of the mold valve assembly 24 according to the present invention is illustrated. The mold valve assembly 24 generally includes a mold valve chamber 26 having an output port 28 and an injection chamber 30 in communication with the mold valve chamber 26 (also illustrated in FIG. 3). The mold valve chamber 26 defines a mold valve axis M. The injection chamber 30 defines an injection chamber axis I. The injection chamber axis I is transverse to the mold valve axis M. An inlet port 32 in communication with the injection chamber 30 defines an inlet axis N. The inlet port 32 receives the mixture material from the mix head assembly 20 (FIG. 1) through a conduit 34 or the like. The inlet axis N is angled relative the mold valve axis M.

An actuator 36 drives an injection piston 38 (FIG. 4A, 4B) along the injection chamber axis I within the injection chamber 30 to drive mixture material from the inlet port 32 into the mold valve chamber 26. The actuator 36 is preferably a pneumatic, hydraulic or electric ram, however, various other drive assemblies will also benefit from the present invention.

Figure 6:
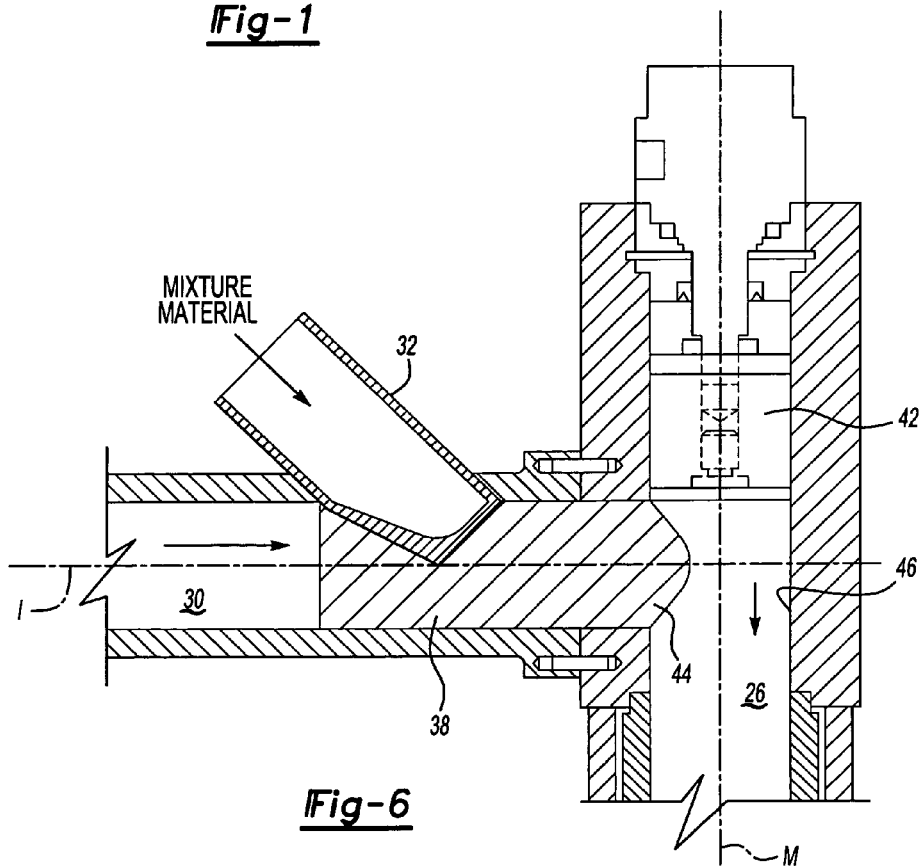
FIG. 6 is a sectional view of the mold valve piston scraping the injection piston during operation of the present invention.

An actuator 40 drives a mold valve piston 42 (FIG. 5A, 5B) along the mold valve axis M within the mold valve chamber 26 to drive mixture material through the outlet 28 and into the mold cavity 25 of the mold assembly 22. The actuator 40 is preferably a pneumatic, hydraulic, or electric ram; however, various other drive assemblies will also benefit from the present invention. The mold valve piston 42 closely fits within the mold valve chamber 26 and scrapes along an end segment 44 of the injection piston 38 to clean any mixture material remnants therefrom (FIG. 6). That is, the mold valve piston 42 scrapes the mixture material off the end segment 44 and the inner perimeter 46 of the mold valve chamber 26 such that no remnants remain within the mold valve chamber 26. The necessity of flushing between injection cycles is substantially eliminated as the plunger need only be cycled up and down. Cycle time for production and expense of each finished article is thereby decreased.

Referring to FIG. 4A, a side view of the end segment 44 of the injection piston 38 includes an arcuate segment 48 transverse to axis I. A second arcuate segment 50 is defined approximately ninety degrees to the first arcuate segment 48 and defines an apex toward the mold valve chamber 26 (FIG. 6). The configuration of the end segment 44 completes the inner perimeter 46 of the mold valve chamber 26 when fully extended. By completing the inner perimeter 46 of the mold valve chamber 26 where the injection chamber 30 communicates with the mold valve chamber 26, the mold valve piston 42 will scrape along the end segment 44 of the injection piston 38 (FIG. 6).

Referring to FIG. 5A, the mold valve piston 42 includes a metallic support assembly 52 and a nonmetallic member 54. The metallic support assembly 52 is preferably manufactured of 4140 tool steel and the nonmetallic member 54 is preferably manufactured of 25 percent glass filled Teflon. The metallic support assembly 52 includes an upper portion 56 and a lower portion 58. The upper and lower portions 56, 58 are preferably threaded together to retain the cylindrical nonmetallic portion 54 (FIG. 5B).

The upper portion 56 defines an upper cylindrical flange 60 and the lower portion 58 defines a lower cylindrical portion 62. The upper and lower portions 56, 58 are threaded together through complimentary threads 64a, 64b to retain the nonmetallic member 54 therebetween. The upper cylindrical flange 60 and the lower cylindrical portion 62 define an outer diameter which provide a clearance fit with the mold valve chamber 26. Preferably, a diametric clearance of 0.020 is provided. The nonmetallic member 54 defines an outer diameter which provides an interference fit with the mold valve chamber 26. Preferably, a diametric interference of 0.005 is provided.

Referring to FIG. 6, the mixture material is injected into the inlet port 32 of the mold valve assembly 24. Once a predefined quantity is injected through mold valve assembly 24, the actuator 36 is initiated by the controller 23 to drive the injection piston 38 along the injection chamber axis I toward the mold valve chamber 26. The injection piston 38 closes off the inlet port 32 to the injection chamber 30 and simultaneously drives the mixture material from the inlet port 32 into the mold valve chamber 26. The end segment 44 of the injection piston 38 completes the inner perimeter 48 of the mold valve chamber 26.

The actuator 40 is then initiated by the controller 23 to drive the mold valve piston 42 along the mold valve axis M within the mold valve chamber 26 to drive mixture material through an outlet 44 an into the mold cavity 25 of the mold assembly 22. The mold valve piston 42 closely fits within the mold valve chamber 26 and scrapes along the end segment 44 of the injection piston 38 to clean any mixture material remnants therefrom such that no minimal remnants remain within the mold valve chamber 26. The necessity of flushing between injection cycles is therefore eliminated. Cycle time for production and expense of each finished article is thereby decreased.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A mold valve assembly for a molding system comprising:
   a mold valve chamber comprising an output port, said mold valve chamber defining a first axis;
   an injection chamber in communication with said mold valve chamber, said injection chamber defining a second axis transverse to said first axis;
   a mold valve piston movable within said mold valve chamber, said mold valve piston comprises a nonmetallic cylinder between a first metallic portion and a second metallic portion said non-metallic cylinder defining an interference fit within said mold valve chamber; and
   an injection piston movable within said injection chamber, an end segment of said injection piston movable to define a portion of a mold valve chamber inner perimeter.

2. The mold valve assembly as recited in claim 1, wherein each of said first metallic portion and said second metallic portion include a flange and a threaded portion, each of said flanges define a clearance fit within said mold valve chamber.

3. A mold valve assembly for a molding system comprising:
   a mold valve chamber comprising an output port, said mold valve chamber defining a first axis;
   an injection chamber in communication with said mold valve chamber, said injection chamber defining a second axis transverse to said first axis;
   an injection piston movable within said injection chamber, an end segment of said injection piston movable to define a portion of a mold valve chamber inner perimeter;
   a mold valve piston movable within said mold valve chamber, said mold valve piston comprises a nonmetallic portion between a first metallic portion and a second metallic portion, said first metallic portion threads to said second metallic portion to axial compress said non-metallic portion therebetween; and said non-metallic portion includes a non-metallic cylinder which at least partially receives said first metallic portion and said second metallic portion therein.

4. A mold valve assembly for a molding system comprising:

a mold valve chamber comprising an output port, said mold valve chamber defining a first axis;

an injection chamber in communication with said mold valve chamber, said injection chamber defining a second axis transverse to said first axis;

an injection piston movable within said injection chamber, an end segment of said injection piston movable to define a portion of a mold valve chamber inner perimeter;

a mold valve piston movable within said mold valve chamber, said mold valve piston comprises a non-metallic portion between a first metallic portion and a second metallic portion, said first metallic portion threads to said second metallic portion to axial compress said non-metallic portion therebetween; and each said first metallic portion and said second metallic portion includes a flange and a threaded portion, each of said threaded portions located at least partial within said non-metallic portion.

* * * * *